US011221781B2

(12) United States Patent
Perez et al.

(10) Patent No.: US 11,221,781 B2
(45) Date of Patent: Jan. 11, 2022

(54) DEVICE INFORMATION SHARING BETWEEN A PLURALITY OF LOGICAL PARTITIONS (LPARS)

(71) Applicant: International Business Machines Corporation, Armonk, NY (US)

(72) Inventors: Miguel Perez, Miami, FL (US); David C. Reed, Tucson, AZ (US); Dash D. Miller, St. Louis Park, MN (US); George Kozakos, Forrest (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/813,519

(22) Filed: Mar. 9, 2020

(65) Prior Publication Data

US 2021/0278982 A1    Sep. 9, 2021

(51) Int. Cl.
*G06F 3/06*    (2006.01)
*G06F 1/06*    (2006.01)

(52) U.S. Cl.
CPC .............. *G06F 3/0644* (2013.01); *G06F 1/06* (2013.01); *G06F 3/0604* (2013.01); *G06F 3/0674* (2013.01)

(58) Field of Classification Search
CPC .... G06F 3/0644; G06F 3/0604; G06F 3/0674; G06F 1/06
See application file for complete search history.

(56) References Cited

U.S. PATENT DOCUMENTS

| | | | |
|---|---|---|---|
| 6,701,332 B1* | 3/2004 | Vella | G06F 3/0607 |
| 8,582,607 B2 | 11/2013 | Surek et al. | |
| 9,448,807 B2 | 9/2016 | Haug et al. | |
| 2002/0116506 A1 | 8/2002 | Lautner | |

(Continued)

FOREIGN PATENT DOCUMENTS

WO    2012066597 A1    5/2012

OTHER PUBLICATIONS

Wikipedia, "Logical partition," Wikipedia, 2020, 4 pages, retrieved from https://en.wikipedia.org/wiki/Logical_partition.

(Continued)

*Primary Examiner* — David Yi
*Assistant Examiner* — Alan Otto
(74) *Attorney, Agent, or Firm* — Zilka-Kotab, P.C.

(57) ABSTRACT

A computer-implemented method according to one embodiment includes obtaining, by a first LPAR, first device information about devices that a first LPAR is physically connected to. The first device information is sent by the first LPAR to a storage device for storage therein. Second device information stored on the storage device by a second LPAR is accessed by the first LPAR. The second device information includes information about devices that the second LPAR is physically connected to. The method further includes performing, by the first LPAR, a function using the second device information. A computer program product for device information sharing between a plurality of LPARs according to another embodiment includes a computer readable storage medium having program instructions embodied (Continued)

therewith. The program are instructions readable and/or executable by a first LPAR to cause the first LPAR to perform the foregoing method.

20 Claims, 8 Drawing Sheets

(56) References Cited

U.S. PATENT DOCUMENTS

| | | |
|---|---|---|
| 2004/0044643 A1 | 3/2004 | deVries et al. |
| 2007/0294065 A1 | 12/2007 | Gimpl et al. |
| 2015/0109531 A1* | 4/2015 | Nishio .............. H04N 21/4305 348/537 |
| 2017/0235677 A1* | 8/2017 | Sakaniwa ........... G06F 12/0895 711/119 |
| 2019/0340043 A1 | 11/2019 | Trulli, Jr. et al. |

OTHER PUBLICATIONS

IBM, "Mainframe hardware: Logical partitions (LPARs)," IBM Knowledge Center, 2010, 3 pages, retrieved from https://www.ibm.com/support/knowledgecenter/zosbasics/com.ibm.zos.zmainframe/zconc_mfhwlpar.htm.

\* cited by examiner

```
12.32.11 SYSTEM1 DS QD,D800,QHA
12.32.11 SYSTEM1 IEE459I 12.32.11 DEVSERV QDASD 161
UNIT VOLSER SCUTYPE DEVTYPE      CYL SSID SCU-SERIAL DEV-SERIAL EFC
0D800 VOL001 2107986 2107900    3339 6800 0175-HFK71  0175-HFK71  *OK
QUERY HOST ACCESS TO VOLUME
PATH-GROUP-ID    FL STATUS SYSPLEX SYSTEM MAX-CYLS STP-NODE-ID TIME-OFFSET
800007E2B73906D3760B50 50 ON PLEX1 LPAR1 1182006 stpserial1 07
880005E2B73906D3760BE6* 50 ON LOCAL SYSTEM1 1182006 N/A N/A
800009E2B73906D3760F82 50 ON PLEX2 LPAR2 1182006 stpserial2 07
800004E2B73906D3760F86 50 ON PLEX1 LPAR6 1182006 stpserial1 07
8000AE2B73906D3761 OSF 50 ON PLEX3 MES3 1182006 stpserial1 01
800001E2B73906D376137A50 ON PLEX3 N/A 1182006 N/A N/A
800002E2B73906D376141C 50 ON PLEX1N/A1182006 N/A N/A
800006E2B73906D376141E00 OFF PLEX1 LPAR9 1182006 stpserial1 07
**** 8 PATH GROUP ID(S) MET THE SELECTION CRITERIA
```

DEVICE INFORMATION SHARING BETWEEN A PLURALITY OF LOGICAL PARTITIONS (LPARS)

BACKGROUND

The present invention relates to LPARs, and more specifically, this invention relates to sharing device information in data storage environments that include LPARs.

A LPAR is typically a logical portion of resources of a computer, that in effect establish a sub-computer thereof. Accordingly, multiple LPARs may share at least some physical hardware of the same computer, e.g., such as central processing units (CPUs), although, depending on the configuration, each of such LPARs may run an operating system that is independent from the other LPARs. An LPAR may be connected to various devices, and often the same device as other LPARs.

SUMMARY

A computer-implemented method according to one embodiment includes obtaining, by a first LPAR, first device information about devices that a first LPAR is physically connected to. The first device information is sent by the first LPAR to a storage device for storage therein. Second device information stored on the storage device by a second LPAR is accessed by the first LPAR. The second device information includes information about devices that the second LPAR is physically connected to. The method further includes performing, by the first LPAR, a function using the second device information.

A computer program product for device information sharing between a plurality of LPARs according to another embodiment includes a computer readable storage medium having program instructions embodied therewith. The program are instructions readable and/or executable by a first LPAR to cause the first LPAR to perform the foregoing method.

A system according to another embodiment includes a processor and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 5 is a sample of device information, in accordance with one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for remote copy device information sharing.

In one general embodiment, a computer-implemented method includes obtaining, by a first LPAR, first device information about devices that a first LPAR is physically connected to. The first device information is sent by the first LPAR to a storage device for storage therein. Second device information stored on the storage device by a second LPAR is accessed by the first LPAR. The second device information includes information about devices that the second LPAR is physically connected to. The method further includes performing, by the first LPAR, a function using the second device information.

In another general embodiment, a computer program product for device information sharing between a plurality of LPARs includes a computer readable storage medium having program instructions embodied therewith. The program are instructions readable and/or executable by a first LPAR to cause the first LPAR to perform the foregoing method.

In another general embodiment, a system includes a processor and logic integrated with the processor, executable by the processor, or integrated with and executable by the processor. The logic is configured to perform the foregoing method.

Figure 1:
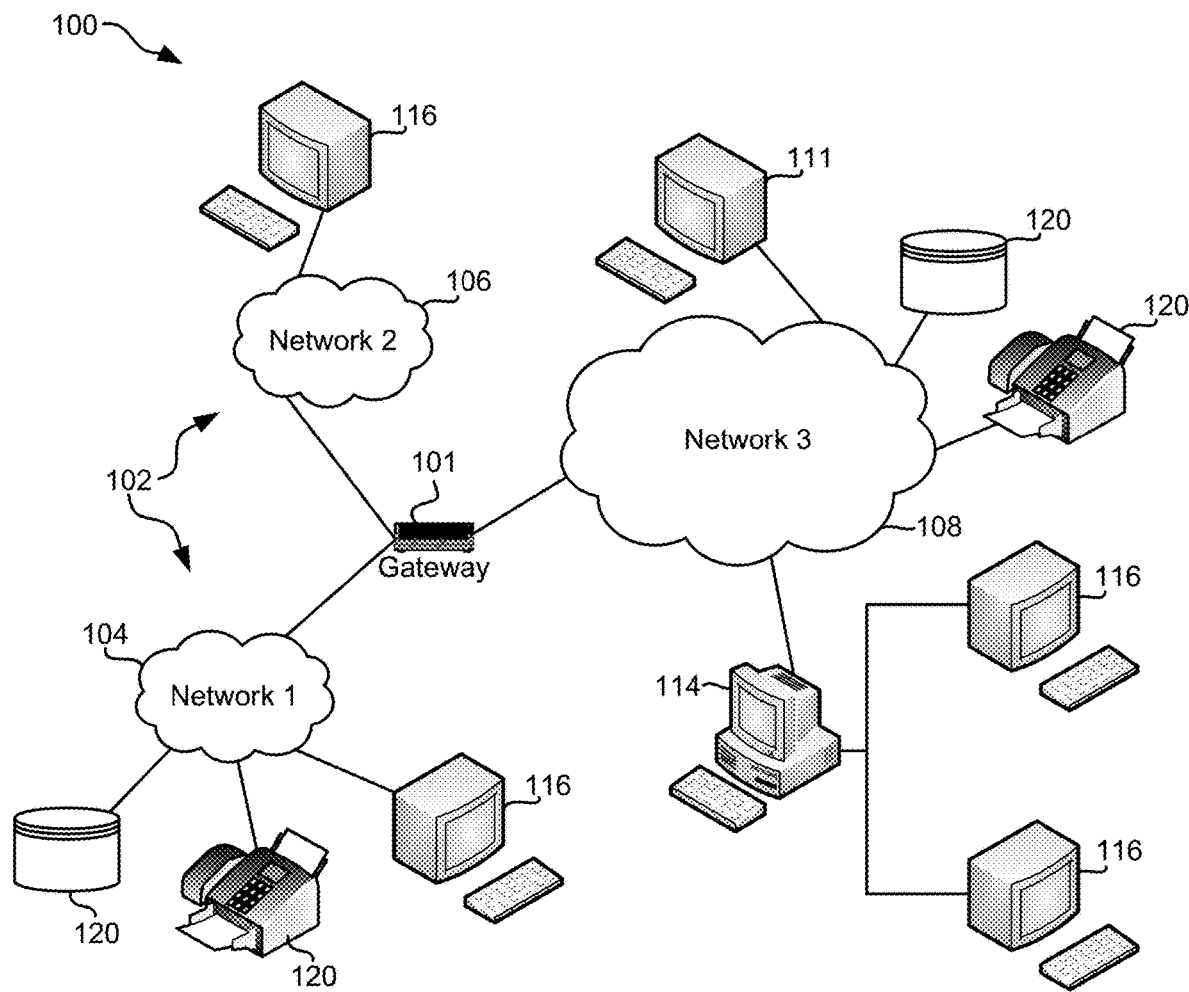
FIG. 1 is a diagram of a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment, a UNIX® system which virtually hosts a Microsoft® Windows® environment, a Microsoft® Windows® system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
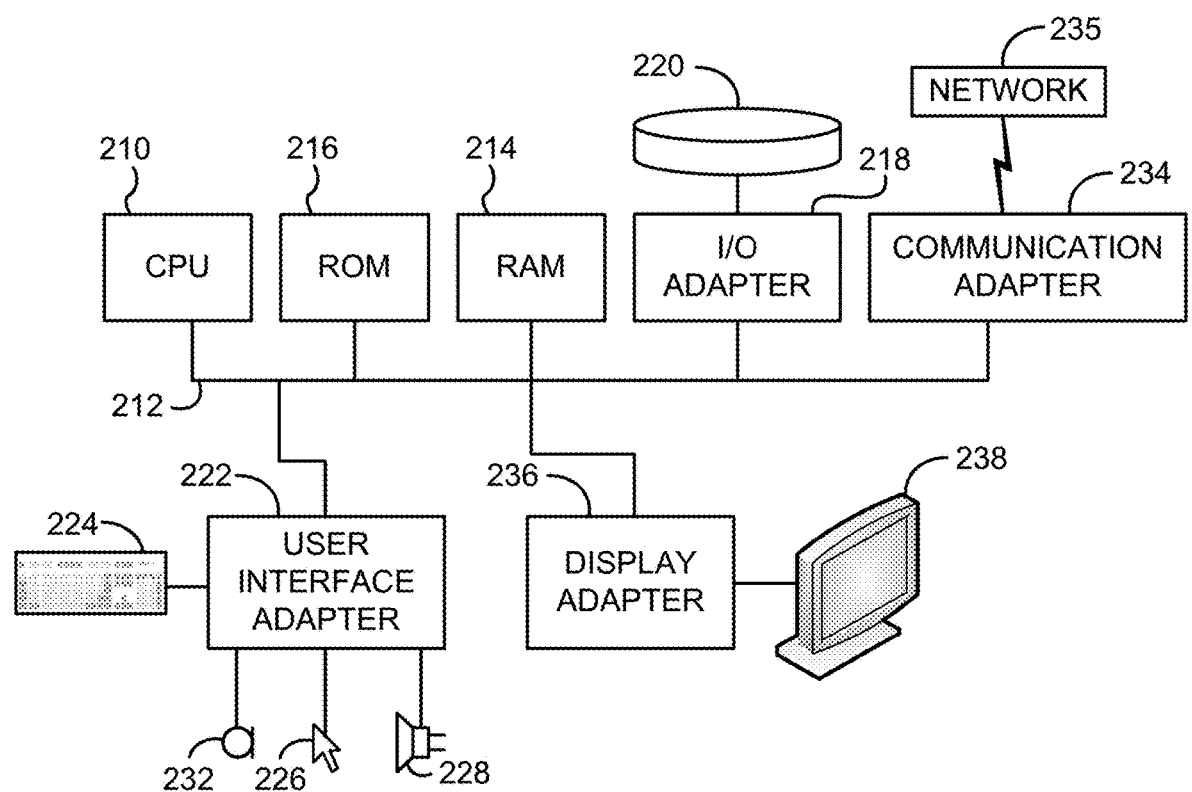
FIG. 2 is a diagram of a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
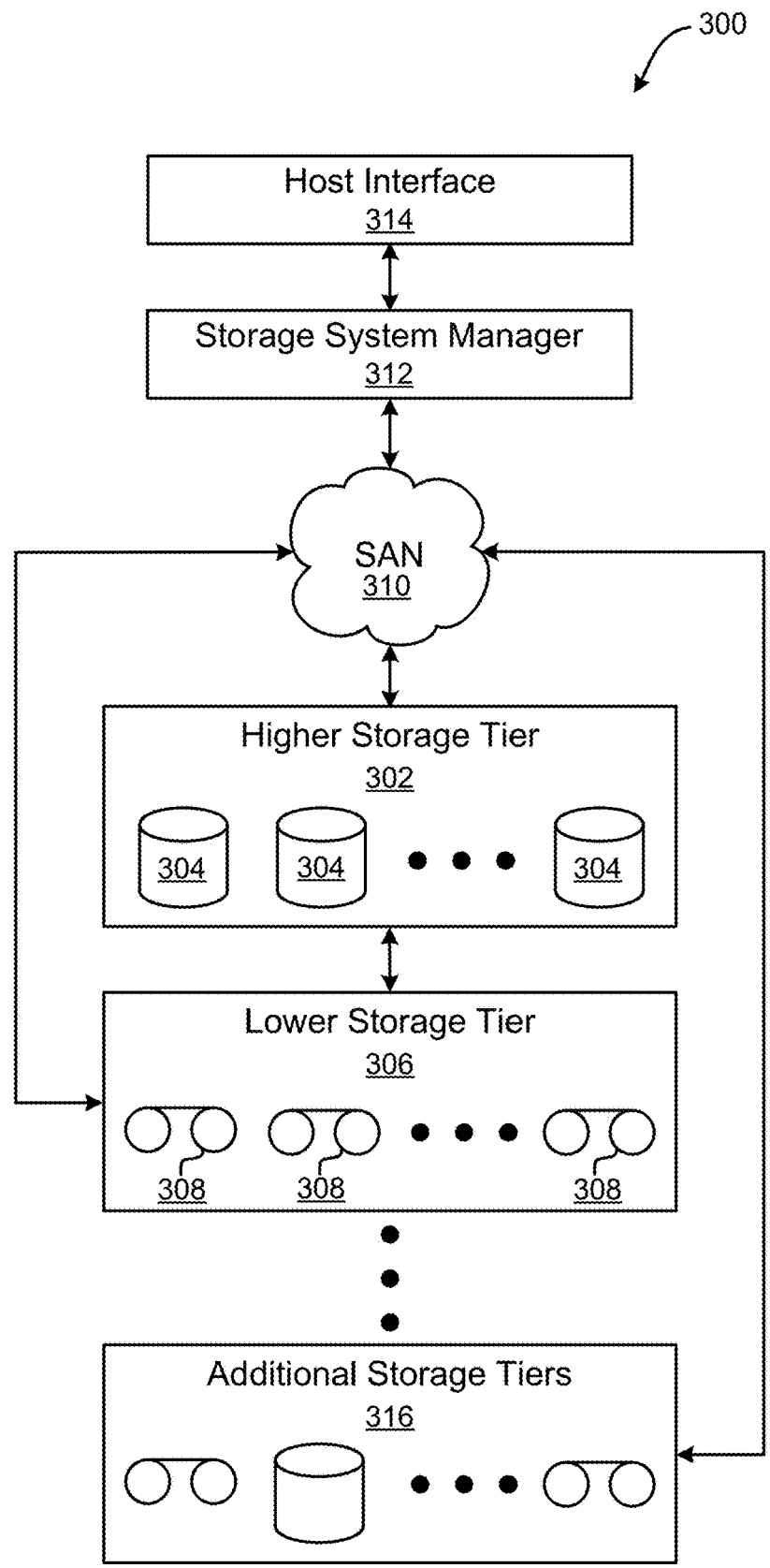
FIG. 3 is a diagram of a tiered data storage system, in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As mentioned elsewhere above, a LPAR is typically a logical portion of resources of a computer, that in effect establish a sub-computer thereof. Accordingly, multiple LPARs may share at least some physical hardware of the same computer, e.g., such as CPUs, although, depending on the configuration, each of such LPARs may run an operating system that is independent from the other LPARs. An LPAR may be connected to various devices, and often the same device as other LPARs.

In typical data storage environments that include LPARs, each LPAR is only able to query devices that are physically connected. However, each LPAR is not able to share this information with other LPARs. In some data storage environments, LPARs may be unaware of which server time protocol (STP) time source each application LPAR is using. Such LPARs may be configured to mirror data from primary volumes to secondary volumes, e.g., which may be stored at primary and/or remote sites. For environments in which LPARs are unaware of which server time protocol (STP) time source each application LPAR is using, consistency group formation issues, e.g., such as stalls or interlock delays, may occur on the LPARs when two or more application LPARs are writing to the same primary volumes connected to different STP time sources.

Various embodiments and approaches described herein avoid the time source issues mentioned above by maintaining a storage device having device information stored thereon by a plurality of LPARs.

Now referring to FIGS. 4A-4F, a flowchart of a method 400 is shown according to one embodiment. The method 400 may be performed in accordance with the present invention in any of the environments depicted in FIGS. 1-3 and 5, among others, in various embodiments. Of course, more or fewer operations than those specifically described in FIGS. 4A-4F may be included in method 400, as would be understood by one of skill in the art upon reading the present descriptions.

Each of the steps of the method 400 may be performed by any suitable component of the operating environment. For example, in various embodiments, the method 400 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that various embodiments and/or approaches described herein may be performed in any type of data storage environment. For example, in some approaches, method 400 may be performed in a known type of data storage environment that includes one or more known type(s) of LPARs. According to some more specific approaches, method 400 may specifically be performed in a data storage environment that includes XRC LPARs by IBM®, e.g., see FIG. 5. Moreover, in some preferred approaches method 400 may be performed by one or more LPARs of a data storage environment, e.g., see a first LPAR of method 400. In contrast, one or more operations of various approaches described herein may be performed by a managing device, e.g., a computer, a controller, a processor, etc., which may be configured to relay one or more operations between LPARs of the data storage environment.

Figure 4A:
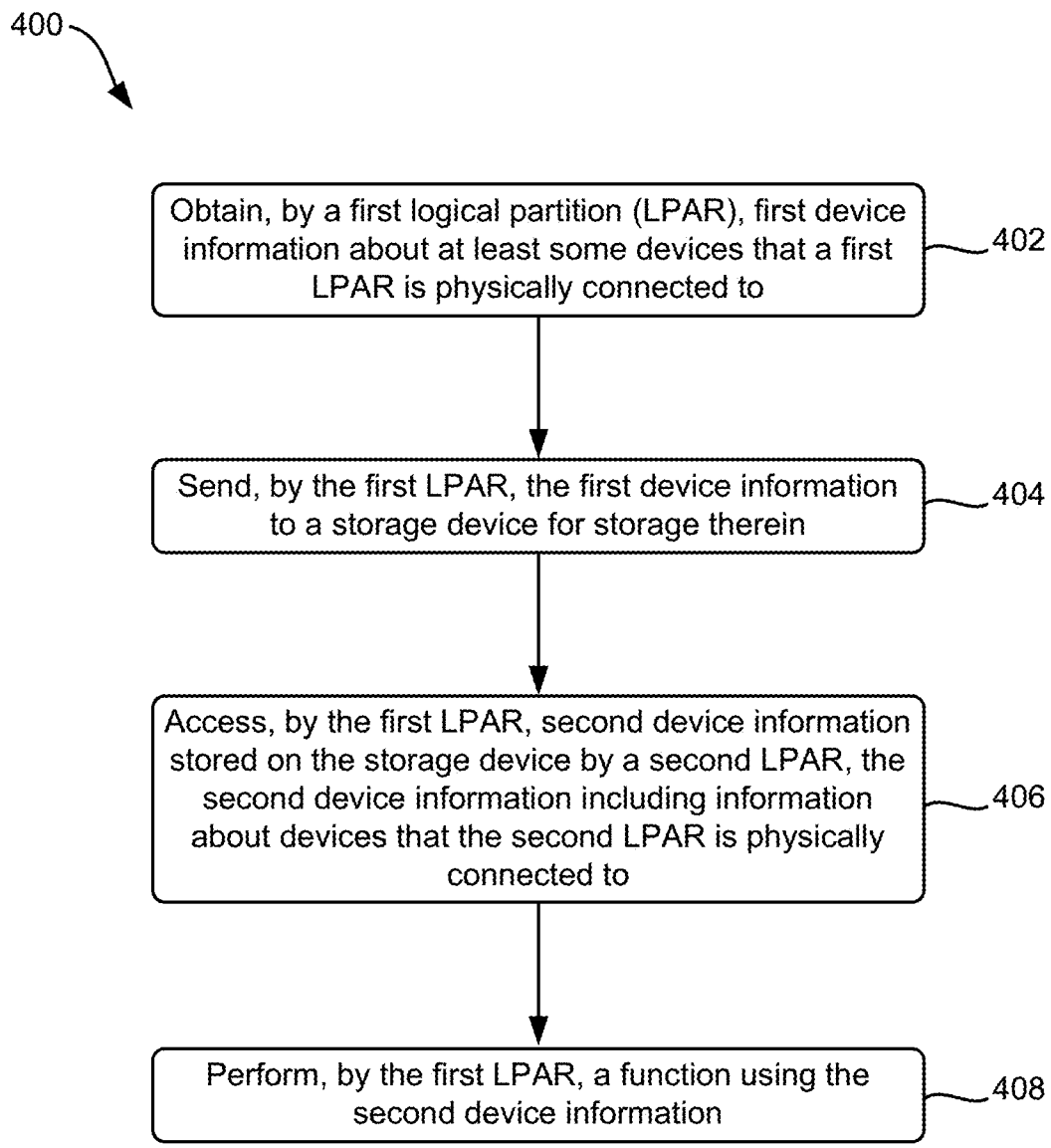
FIG. 4A is a flowchart of a method, in accordance with one embodiment.

With continued reference to FIG. 4A, operation 402 of method 400 includes obtaining, by a first logical partition (LPAR), first device information about at least some devices that a first LPAR is physically connected to. Such device information may be obtained using any one or more known techniques. For example, in some approaches, device information may be obtained by an LPAR using a known type of querying technique.

Any LPAR connected to the same storage device may in some approaches be configured to provide a full device audit to aid during a known type of configuration setup. As will be described elsewhere herein, information obtained from a device audit may be received and incorporated into a configuration setup thereafter, e.g., such as by storing the received information on a shared storage device.

The device information may include any one or more types of device information. A non-limiting list of types of device information may include, e.g., restricted device information, unrestricted device information, identities of devices, configuration settings of devices, timestamp information, etc. For some approaches in which the first device information include identities of the devices that the first LPAR is physically connected to, the identities of the devices that the first LPAR is physically connected to may include one or more identities associated with a device such as, e.g., a processor, a channel extender, a time source (e.g., a STP time source), a printer number, a router number, a camera model, a scanner number, a relay device number, a controller name, a processor number, a power supply type, etc. Moreover, in some approaches in which the first device information include configuration settings of the devices that the first LPAR is physically connected to, the configuration settings of the devices that the first LPAR is physically connected to may include, e.g., a processor capacity, a channel extender capacity, a coordinated universal time (UTC) timestamp, etc.

It should be noted that although in some preferred approaches, operation 402 may include the first LPAR obtaining first device information about all devices that the first LPAR is physically connected to, a number of devices that device information is obtained from by the first LPAR may optionally be reduced. For example, one or more predetermined parameters may be applied during obtaining the first device information for reducing a number of devices that device information is obtained for. According to an illustrative example, one or more predetermined parameters may be applied which specify one or more types of device information that are to be collected by the first LPAR. Such parameters may additionally and/or alternatively specify device types that are to be considered during the obtaining of device information. For example, in some approaches one or more locations of a data storage environment that are to be considered and/or excluded by the first LPAR during obtaining the device information may be predetermined and/or applied. According to another approach, predetermined parameters may specify one or more types of physical connections that are to be considered and/or excluded by the first LPAR for obtaining the first device information.

In one approach the first device information may be obtained once. In some other approaches, the first device information may be obtained any predetermined number of times. In yet some other approaches, the first device information may be obtained according to a predetermined interval, e.g., in order to ongoingly obtain up-to-date device information. In yet another approach, the first device information may be obtained in response to a determination that a predefined event has occurred, e.g., in response to receiving input from a user, in response to one or more devices becoming physically connected with the first LPAR, in response to one or more devices becoming physically disconnected with the first LPAR, in response to one or more LPARS losing connectivity with a storage device on which device information is stored, in response to a determination that a device has been connected to the first LPAR since first device information was most recently obtained, etc.

The first device information may be stored on and/or sent to any one or more predetermined storage media, e.g., according any one or more of the frequencies in which the device information is obtained as listed above. For example, operation 404 of method 400 includes the first LPAR sending the first device information to a storage device for storage therein. According to various approaches, the storage device may be sent to, e.g., a cloud storage device, a known type of storage device that is included in a system that includes the first LPAR, etc. Moreover, the device information may be stored in any one or more known types of predetermined format(s), e.g., such as a format that is specific to the type of device that the information corresponds to.

In one preferred approach, the device information received from the first LPAR may be stored on a known type of shared direct-access storage device (DASD) subsystem. The shared DASD subsystem may be shared by any number of LPARs, e.g., the first LPAR, a second LPAR, a tenth LPAR, etc. The first device information may in some approaches be appended to device information already stored on the shared DASD subsystem, e.g., such that storing the device information to the shared DASD subsystem thereby extends an existing Dynamic Syntax (DS) QD,nnnn,QHA information set. The DS QD,nnnn,QHA information set may be of any conventional type, and modified (e.g., extended) as disclosed herein.

As will be described elsewhere below, storing device information received from the first LPAR on the shared DASD subsystem enables the devices physically connected to the first LPAR to be synchronized to a common time source, e.g., STP time source, with one or more devices of other LPARs that have access to the shared DASD subsystem. Accordingly, timing issues such as, e.g., stalls, interlock delays, errors etc., that may have otherwise occurred on the LPARs as a result of two or more applications of such LPARs writing to the same primary volumes while being connected to different STP time sources are avoided.

In some approaches, device information other than the first device information may be obtained and sent to the storage device by other LPARs to enable the first LPAR to access device information for devices physically connected to other LPARs. For example, monitoring for a predetermined type of connection to be established between a second LPAR and the storage device may be performed. From a perspective of the first LPAR, such monitoring may be performed by checking the storage device for a recently added type of device information, e.g., second device information. For context, such monitoring may in some approaches be performed in order to prevent devices physically connected to an LPAR that include unique and/or unknown STP time sources, from creating issues in a system upon a connection being established thereto. Upon being connected to the storage device, the second LPAR may obtain device information about at least some devices that the second LPAR is physically connected to (e.g., hereafter "second device information"). The second LPAR may thereafter send the second device information to the storage device for storing therein.

Operation 406 of method 400 includes the first LPAR accessing the second device information stored on the storage device by a second LPAR. As will be described elsewhere herein, e.g., see FIG. 4E, in some approaches LPAR access to device information may be selectively controlled by an LPAR to which the device information corresponds.

Subsequent to accessing the second device information stored on the storage device, the first LPAR may perform a function using the second device information, e.g., see operation 408 of method 400. Depending on the approach, one or more functions may be performed by the first LPAR using such device information for purposes of, e.g., device configuration, scalability, intercommunication, etc.

Looking to FIGS. 4B-4F, exemplary sub-operations of performing a function using accessed device information are illustrated in accordance with various embodiments, one or more of which may be used to perform operation 408 of FIG. 4A. However, it should be noted that the sub-operations of FIGS. 4B-4F are illustrated in accordance with various embodiments which are in no way intended to limit the invention.

Figure 4B:
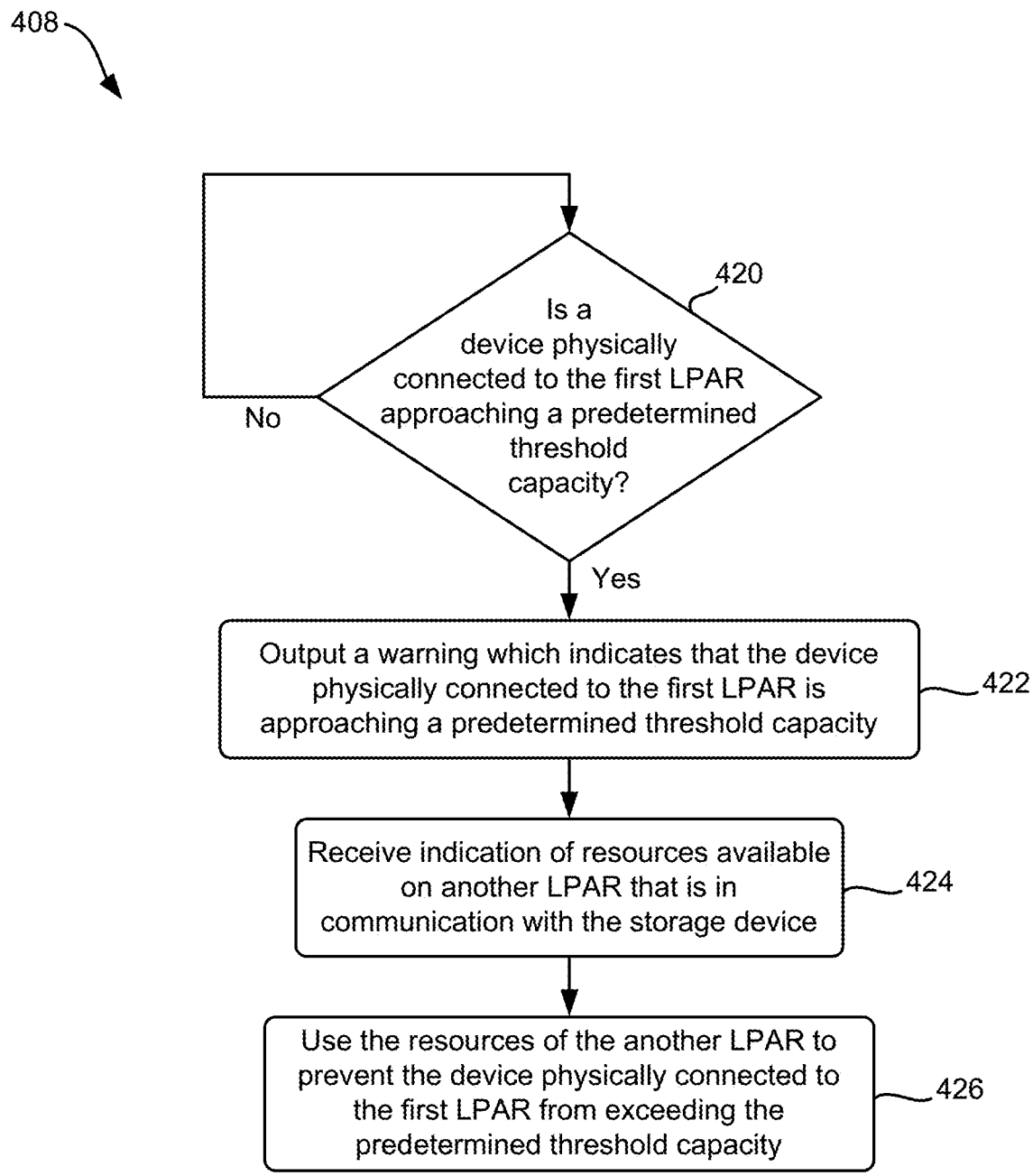
FIG. 4B is a flowchart of a plurality of sub-operations of an operation of the method of FIG. 4A.

Referring first to FIG. 4B, in some approaches a device physically connected to an LPAR may be prevented from exceeding the predetermined threshold capacity based on another LPAR accessing device information on the storage system. More specifically, in some approaches, a device physically connected to an LPAR, e.g., the second LPAR, may be utilized to perform one or more operations for another device physically connected to a different LPAR, e.g., the first LPAR, in order to prevent a predetermined threshold capacity from being exceeded. For context, the predetermined threshold capacity may be defined by any one or more known metrics. For example, according to various approaches, the predetermined threshold capacity may be at least in part based on, e.g., a processing output of an LPAR, a number of operations being concurrently performed by a device, a size of a data mirroring operation, a temperature of a device, an I/O rate, a predetermined performance metric, a processing utilization, etc.

Sub-operation 420 includes determining whether a device physically connected to the first LPAR is approaching a predetermined threshold capacity. Monitoring may be performed using any one or more known techniques for determining a current capacity of a device physically connected to an LPAR. In response to a determination that no devices physically connected to the first LPAR are approaching the predetermined threshold capacity (e.g., as illustrated by the "No" logical path of sub-operation 420) the process may continue.

However, in response to a determination that a device physically connected to the first LPAR is approaching a predetermined threshold capacity (e.g., as illustrated by the "Yes" logical path of sub-operation 420) a warning may be output, e.g., from the first LPAR, from the storage device, from a controller, etc., which indicates that the device physically connected to the first LPAR is approaching a predetermined threshold capacity, e.g., see sub-operation 422 of method 400.

In one approach, the warning may be output to the storage device for saving thereon. Thereafter, another LPAR having resources available for using to perform operations for the first LPAR may be determined. It should be noted that the LPARs may not be able to communicate (not coupled in a sysplex) with each other directly. Accordingly, any communication utilized to, e.g., grant device access, use resources of the second LPAR to prevent a device physically connected to the first LPAR from exceeding a predetermined threshold capacity, etc., may in some approaches be performed through the storage device. For example, such communication may be enabled by a shared DASD subsystem. More specifically, in one approach, the second LPAR may access the warning stored on the storage device and determine available resources. The second LPAR may optionally send information detailing such determined available resources to the storage device for storing thereon, which thereafter may serve as an indication for the first LPAR of available resources for preventing the device physically connected to the first LPAR from exceeding the predetermined threshold capacity.

Sub-operation 424 includes receiving indication of resources available on another LPAR that is in communication with the storage device. For example, in one approach such indication may be received based on the first LPAR accessing information stored on the storage device by the second LPAR. The resources of the another LPAR may be used to prevent the device physically connected to the first LPAR from exceeding the predetermined threshold capacity, e.g., see sub-operation 426.

In some approaches, the another LPAR in communication with the storage device may be a third LPAR. In one or more of such approaches, using the resources of the third LPAR to prevent the device physically connected to the first LPAR from exceeding the predetermined threshold capacity may include outputting a request for a device physically connected to the third LPAR to perform an operation for the device physically connected to the first LPAR. In some approaches a device of the third LPAR may be ongoingly used to perform one or more operations for preventing the device physically connected to the first LPAR from exceeding the predetermined threshold capacity. For example, in one approach, the scalable configuration settings of the device physically connected to the third LPAR may dynamically adjust scalable configuration settings of the third LPAR to prevent the device physically connected to the first LPAR from exceeding the predetermined threshold capacity. In another approach, the third LPAR may increase a current I/O workload of scalable devices such as processors physically connected to the third LPAR, e.g., incorporating performance of at least some operations of the first LPAR into an I/O workload of the scalable devices physically connected to the third LPAR. Note that use of another LPAR device to perform an operation for a device of the first LPAR is described in further detail elsewhere below with respect to a print function, e.g., see FIG. 4F.

Figure 4C:
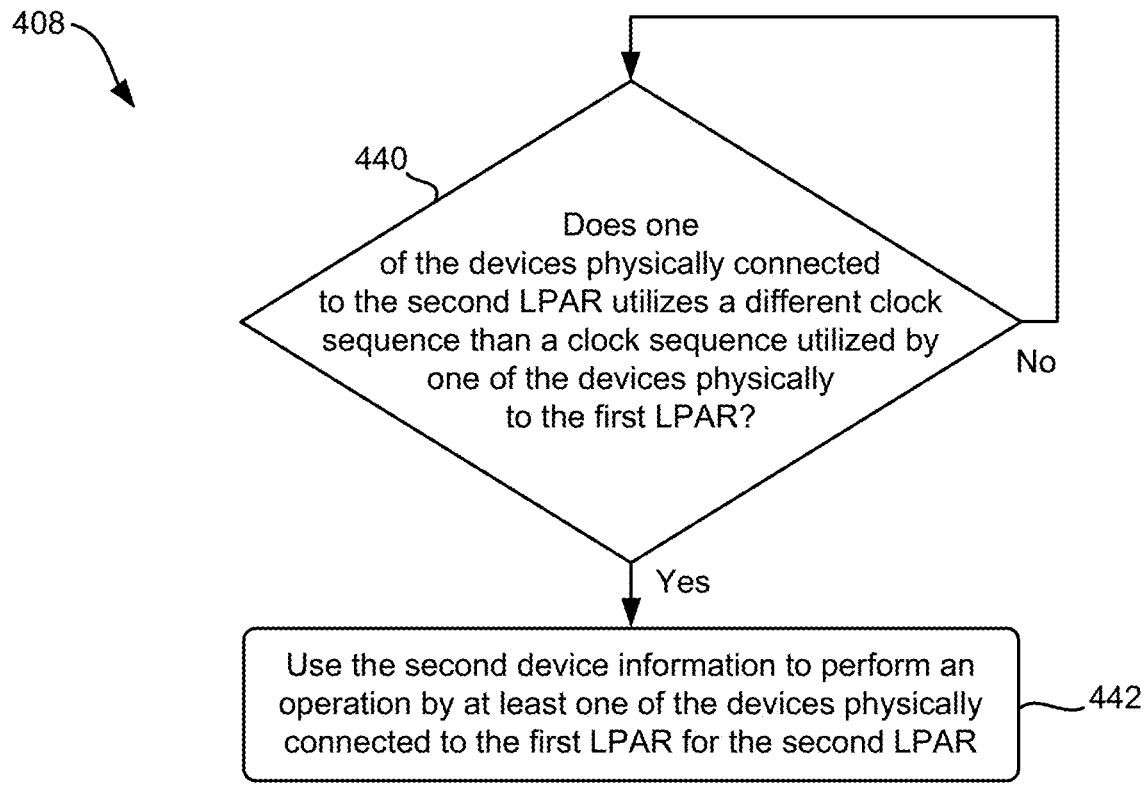
FIG. 4C is a flowchart of a plurality of sub-operations of an operation of the method of FIG. 4A.

FIG. 4C illustrates an approach in which the first LPAR uses device information stored on the storage device to compensate for devices determined to have different clock sequences. This compensation may as a result prevent consistency group formation issues, e.g., such as stalls and/or interlock delays, that may have otherwise occurred on the LPARs as a result of performing an operation using devices with different time sources.

Sub-operation 440 includes determining, using the second device information, whether one of the devices physically connected to the second LPAR utilizes a different clock sequence than a clock sequence utilized by one of the devices physically to the first LPAR. Such a determination is preferably performed by the first LPAR, although in other approaches may additionally and/or alternatively be performed by any one or more LPARs. In one approach, the determination that one of the devices physically connected to the second LPAR utilizes a different clock sequence than a clock sequence utilized by one of the devices physically to the first LPAR may be made based on the accessed device information including a different UTC timestamp than a UTC timestamp of the first LPAR, e.g., different with respect to a clock speed, different with respect to a timestamp detail, different with respect to a recorded time, different with respect to a recorded date, etc.

As indicated above, in response to a determination that one of the devices physically connected to the second LPAR utilizes a different clock sequence than a clock sequence utilized by one of the devices physically connected to the first LPAR (e.g., as illustrated by the "Yes" logical path of sub-operation 440) the first LPAR may compensate for the difference. In one approach, the performed compensation may include using the second device information to perform an operation by at least one of the devices physically connected to the first LPAR for the second LPAR, e.g., see sub-operation 442. For example, in one approach, using the second device information to perform an operation by at least one of the devices physically connected to the first LPAR for the second LPAR may include compensating for the difference in clock sequences, e.g., using a single one of the predetermined clock sequences as a reference thereafter, synchronizing the clocks of the different devices, etc.

In some approaches, one or more of the LPARs may be configured to issue a warning in response to a determination that at least two LPARs have different UTC timestamps. In one approach the warning indicating such a finding may be sent to the storage device for storing therein. In response to a determination that at least two of the LPARs have different UTC timestamps, e.g., which may be determined based on an LPAR comparing obtained device information with device information accessed on the storage device, device information may be used to prevent the differing UTC timestamps from causing performance issues within a system that includes the LPARs. Accordingly, in one approach, method 400 may optionally include using information stored on the shared DASD subsystem for synchronizing timing on the at least two LPARs determined to have different UTC timestamps.

In some approaches, subsequent the timing on the at least two of the LPARs determined to have different UTC timestamps being synchronized, one or more data mirroring operations may be performed, e.g., mirroring data from one or more primary volumes to one or more secondary volumes. In an alternative approach, in response to a determination that the timing has not been synchronized on the at least two of the LPARs determined to have different UTC timestamps, one or more data mirroring operations may optionally be at least temporarily suspended.

Figure 4D:
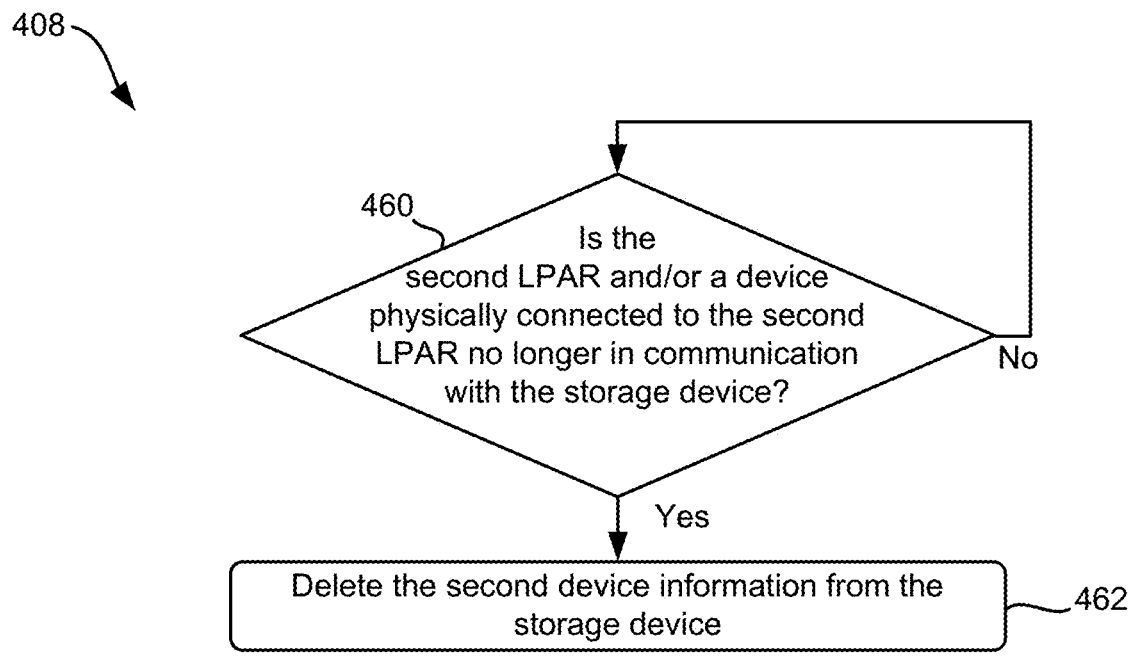
FIG. 4D is a flowchart of a plurality of sub-operations of an operation of the method of FIG. 4A.

With reference now to FIG. 4D, in some approaches, device information stored on the storage device may be updated in response to an event occurring, e.g., such as a loss of connectivity, that may otherwise outdate the device information stored on the storage device. For example, sub-operation 460 includes determining that the second LPAR and/or a device physically connected to the second LPAR is no longer in communication with the storage device. Depending on various approaches, the second LPAR and/or a device physically connected to the second LPAR may be determined to no longer be in communication with the storage based on, e.g., receiving indication of a loss of connectivity, inferring from a lack of periodic updates existing on the second device information on the storage device, determining that less than a predetermined amount of second device information is stored on the storage device, etc.

In response to a determination that the second LPAR and/or a device physically connected to the second LPAR is no longer in communication with the storage device (e.g., as illustrated by the "Yes" logical path of sub-operation 460) the second device information may be deleted from the storage device, e.g., see sub-operation 462. Depending on the approach, the second device information may be deleted from the storage device by one or more of the LPARs, e.g., by the first LPAR, by the second LPAR such as where a device physically connected to the second LPAR has been disconnected, by a third LPAR, etc.

Figure 4E:
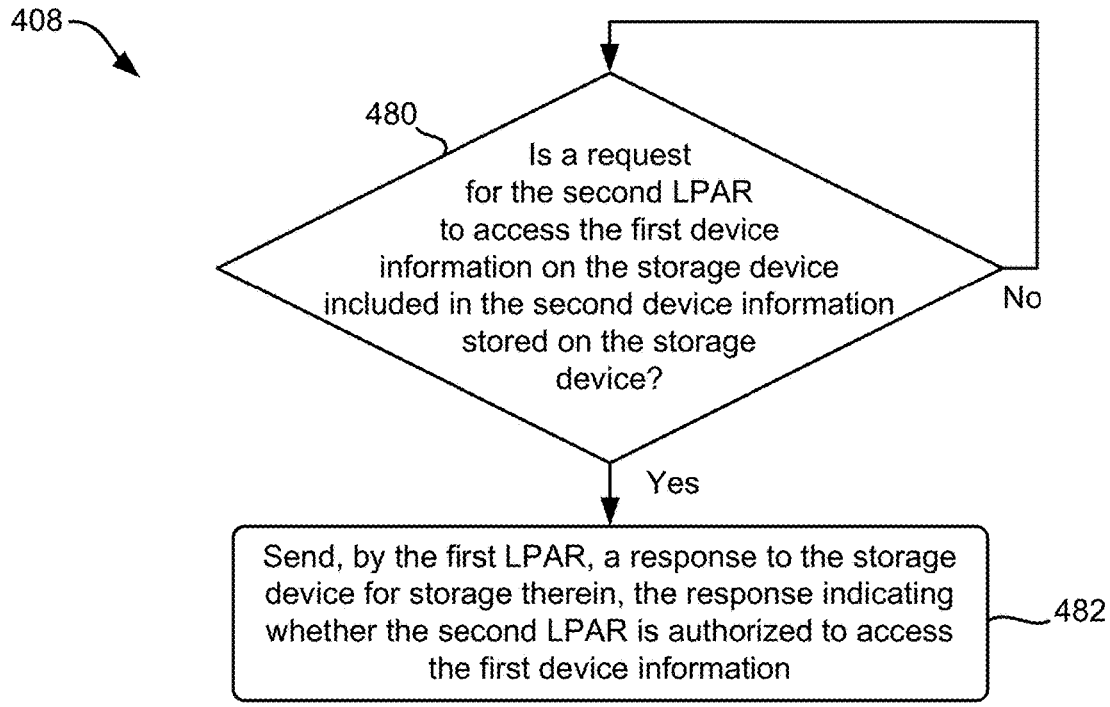
FIG. 4E is a flowchart of a plurality of sub-operations of an operation of the method of FIG. 4A.

With reference now to FIG. 4E, in some approaches, device information may be used to effectively relay requests for access to device information and/or responses to requests for access to device information between LPARs that access such device information on the storage device. For purposes of an illustrative example, it may be assumed that the second LPAR wishes to access the first device information of the first LPAR. Depending on the approach, the request for accessing the first device information may seek any amount of the first device information, e.g., a specified sub-portion of the first device information, a subset of the first device information that corresponds to a random sample of devices physically connected to the first LPAR, first device information that corresponds to at least some predetermined devices physically connected to the first LPAR, etc. Accordingly, the first LPAR may access a request on the storage device for the second LPAR to access the first device information on the storage device. In some approaches, the accessing of the request on the storage device may be an independent accessing operation, such as by an operation that includes accessing a predetermined location of the storage device, e.g., a predetermined file for access requests, predetermined bits of the storage device, one or more predetermined flags, etc., for determining whether any requests are stored thereon for the first LPAR.

In one approach, the access request may have been previously sent to the storage device by the second LPAR for storage therein. It may be determined, e.g., by the first LPAR, whether a request for the second LPAR to access the first device information on the storage device is included in the second device information stored on the storage device, e.g., see sub-operation 480. In response to a determination that a request for the second LPAR to access the first device information on the storage device is included in the second device information stored on the storage device (e.g., as illustrated by the "Yes" logical path of sub-operation 480) the first LPAR may generate a response that indicates whether permission is granted to the second LPAR to access the first device information. For example, sub-operation 482 includes sending, by the first LPAR, a response to the storage device for storage therein. The response preferably indicates whether the second LPAR is authorized, e.g., granted permission, to access the first device information. Thereafter, the second LPAR may access the response stored on the storage device and access the first device information provided that the response indicates that the second LPAR is authorized to access the first device information.

In some approaches the first LPAR may authorize the second LPAR to access the first device information stored on the storage device based on a known type of authentication process being successfully performed. For example, the first LPAR may determine and base authorization on, e.g., the request including a predetermined password, a determination that the second LPAR is authorized to access the first device information (such as based on entries in a table stored on one of the devices physically connected to the first LPAR), the request including timestamp information that may be used to determine that the request was sent by the second LPAR to the storage device within a predetermined period of time, etc.

Figure 4F:
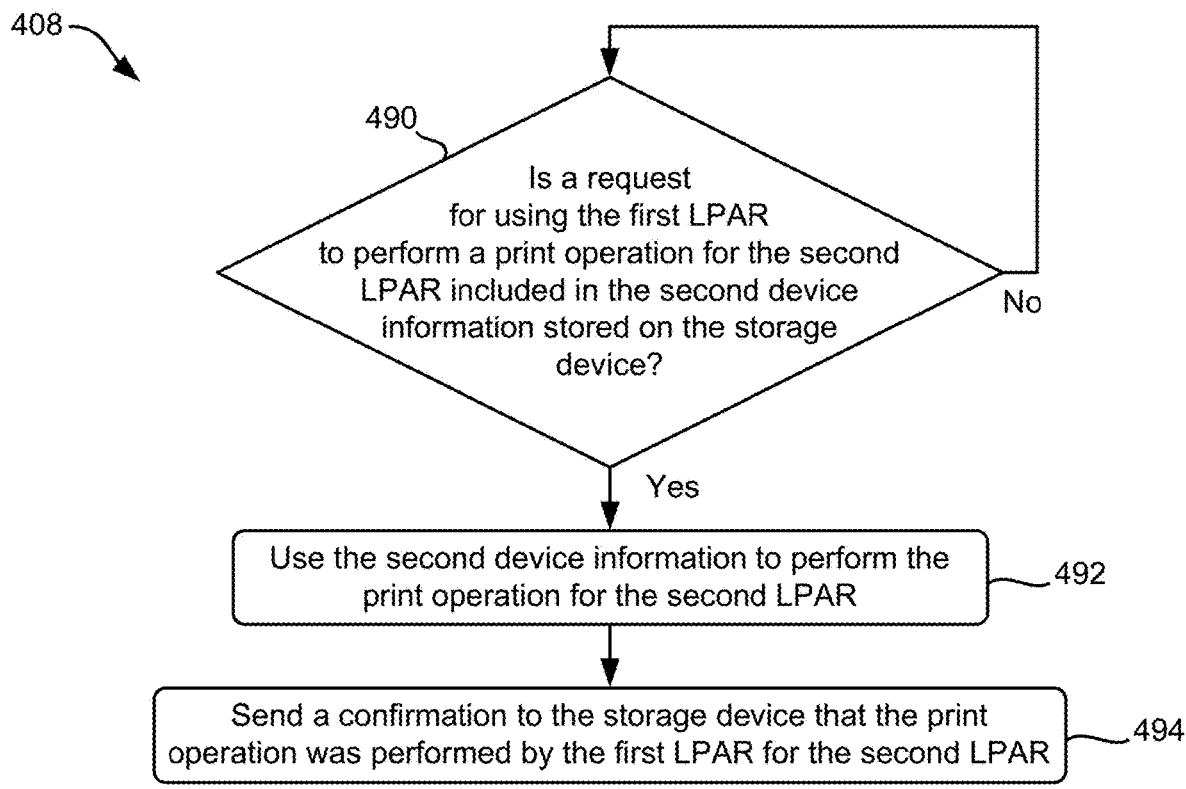
FIG. 4F is a flowchart of a plurality of sub-operations of an operation of the method of FIG. 4A.

With reference now to FIG. 4F, in some approaches, device information may be used to allow operations of a given LPAR such as the second LPAR to be performed on a different LPAR such as the first LPAR. In some approaches, this may prevent a device physically connected to the LPAR that is outsourcing the operation from exceeding a predetermined threshold capacity.

For example, sub-operation 490 includes determining whether a request for using the first LPAR to perform a print operation for the second LPAR, e.g., such as in order to print a document or the like, is included in the second device information stored on the storage device. Such a request may have been previously sent to the storage device by the second LPAR for storing therein. Accordingly, the request may be accessed by the first LPAR on the storage device. In one or more approaches in which the first LPAR is willing to perform the print operation for the second LPAR, the first LPAR may use the second device information to perform the print operation (using one or more devices physically connected to the first LPAR such as a printer) for the second LPAR, e.g., see sub-operation 492. The first LPAR may optionally send a confirmation to the storage device that the print operation will be performed and/or was performed by the first LPAR for the second LPAR, e.g., see sub-operation 494.

With general reference now to method 400, it should be noted that in some approaches, at least some device information may be sent to and/or accessed from the storage device by use of applications of the LPARs. It should be noted that conventional systems that include LPARs do not practice obtaining and sharing of such device information. Recovering from issues, e.g., such as stalls, interlock delays, errors etc., in such systems results in processing resources and processing time being consumed. In sharp contrast, using one or more techniques of various approaches described herein, a system including LPARs experiences a relative performance increase as a result of avoiding such issues.

In order to ongoingly avoid timing-based issues, the device information stored on the storage device may be updated by an LPAR at any predetermined time and/or in response to a determination that one or more predetermined events have occurred. For example, as described elsewhere above, an updating of the device information stored on the shared DASD subsystem may be based on a determination of whether one or more of the LPARs have been disconnected from the shared DASD subsystem. As a result of ongoingly obtaining device information of devices that are physically connected to the LPARs, issues such as, e.g., stalls, interlock delays, errors etc., that may have otherwise occurred on the LPARs as a result of two or more applications and/or devices of such LPARs writing to the same primary volumes while being connected to different STP time sources, are avoided. This is because each LPAR of the system may be selectively provided access to such device information via the storage device, which in turn prevents devices physically connected to the LPARs of the system from having inconsistent STP time sources. For example, based on the second LPAR being granted access to the storage device, the second LPAR may be provided the DS QD,nnnn,QHA information for all other connected LPARs. As a result, according to one illustrative approach, the second LPAR may be aware of the, e.g., processors, channel extenders, UTC timestamp printer, etc., of the first LPAR. Using such information, the STP time sources of such devices may be synchronized and/or compensated for in an event that they are inconsistent. Accordingly, the received device information for at least some of the devices that are physically connected to LPARs of the system may in some approaches be used to establish compatibility between the LPARs as well as the devices physically connected thereto.

FIG. 5 depicts a sample of device information 500, in accordance with one embodiment. As an option, the present sample of device information 500 may be implemented in conjunction with features from any other embodiment listed herein, such as those described with reference to the other FIGS. Of course, however, such sample of device information 500 and others presented herein may be used in various applications and/or in permutations which may or may not be specifically described in the illustrative embodiments listed herein. Further, the sample of device information 500 presented herein may be used in any desired environment.

It may be prefaced that in the current example of FIG. 5, the results of a STP time source device connected to an LPAR on a shared DASD subsystem may be saved. Various embodiments and approaches described herein are not limited by a coupling facility, and therefore any LPAR is preferably able to share connected device information with another LPAR based on device information being saved to a storage device. For example, the device information may be directly saved on a DASD subsystem where DS QD,nnnn,QHA is stored. Moreover, results may be updated in response to an LPAR being initially program loaded (IPLed) and/or devices being varied online and/or offline. More specifically, the present example includes performing time verification in an XRC based environment.

In the present example, an LPAR may invoke a new coupling facility request to store stratum-1 configuration information from a STPC control block, e.g., specifically an active central processor complex (CPC) Node ID STPC_S1 Node1D and/or STPC_AS1 Node1D field.

In one approach, an LPAR may invoke a PTFF-QTO(U) command to store a time offset of the LPAR. The combined information collected may represent unique device information and a unique setting for the STP time source of the LPAR. Upon the definition of, e.g., a PATH-GROUP-ID, varying paths online and/or offline, varying devices online and/or offline, IPL, etc., operations (such as those described in method 400) may be performed by one or more LPARs in order to refresh the new DS QD,nnnn,QHA information and thereby ensure that it is correct at all times. More specifically, in some approaches, the refresh may be performed by utilizing Event Notification (ENF) listeners (such as those by IBM®) from one or more LPARs from which the data is received.

An illustrative example of the new information STP-NODE-ID and TIME-OFFSET that may be stored under DS QD,nnnn,QHA is shown in the sample of device information 500. In the sample of device information 500, LPAR1 has the same STP-NODE-ID and TIME-OFFSET as LPAR6 and LPAR9. Accordingly, each of the LPAR's I/O write updates to device D800 volser VOL001 include timestamps in the same time zone. SYSTEM1 is not assigned to a STP time source device and is not in the same time zone as the others. LPAR2 has an independent STP-NODE-ID and TIME-OFFSET so it is not in the same time zone as the others. Moreover, LPAR3 has the same STP-NODE-ID but independent TIME-OFFSET so it is not in the same time zone as the others.

Now regarding time verification processing, time verification processing may be performed in response to determining that an XRC command, e.g., an XADDPAIR command, has been issued. A DS QD,nnnn,QHA command may be utilized to ensure that all online LPARs for the XADD-PAIR primary volume have the same STP-NODE-ID and TIME-OFFSET. For performance reasons, the unique STP-NODE-ID and TIME-OFFSET (which are preferably the same for all existing primary volumes of a data mover) is saved in a XRC STATE dataset upon successful time verification. In some approaches, the new XADD primary volume STP-NODE-ID and TIME-OFFSET must match the exiting STP-NODE-ID and TIME-OFFSET from the XRC STATE dataset for successful time verification. However, in response to a determination that the verification fails, the XRC XADD function may be utilized to notify a client of the STP time source conflict. Thereafter, monitoring may be performed for a response from the client to continue or fail.

Time verification may additionally and/or alternatively be performed in response to a determination that a XRC command, e.g., XCOUPLE ADD, is requested to couple multiple data movers. STP-NODE-ID and/or TIME-OFF-SET information may be retrieved from the XRC STATE dataset. For performance reasons, the unique STP-NODE-ID and TIME-OFFSET (which are preferably the same for all the coupled data movers) are saved in the XRC CLUSTER or MASTER dataset upon a determination that time verification is successful. In some approaches, the new XCOUPLE ADD data mover's STP-NODE-ID and TIME-OFFSET from the STATE dataset must match the exiting STP-NODE-ID and TIME-OFFSET from the XRC CLUSTER or MASTER dataset for successful time verification. In the event that a determination is made that the verification fails, a XRC XCOUPLE XADD function may be performed to notify a client of the STP time source conflict. Thereafter, monitoring may be performed for a response from the client to continue or fail. However, in response to a determination that the time verification is successful, all data movers (including IDLE) may be coupled. It should be noted that one or more operations of the time verification process described above may be performed according to an "as needed" basis in any XRC process, e.g., such as XRE-COVER when the data movers are to re-couple. In this way, a technique is enabled to mitigate XRC STP time source related issues, and accordingly interlocking delays are avoided.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    obtaining, by a first logical partition (LPAR) of a computer, information about first devices physically connected to the computer,
    wherein the information about the first devices includes timestamp information of the first devices;
    sending, by the first LPAR, the information about the first devices to a storage device for storage therein;
    accessing, by the first LPAR, information about second devices physically connected to the computer, wherein the information about second devices was previously stored on the storage device by a second LPAR of the computer,
    wherein the information about the second devices includes timestamp information of the second devices;
    accessing, by the first LPAR, a request on the storage device for using the first LPAR to perform a first operation for the second LPAR,
    wherein the request was previously sent to the storage device by the second LPAR for storage therein,
    wherein the request is accessed by the first LPAR in an independent access operation performed on a predetermined file designated for access requests; and
    performing, by the first LPAR, the first operation for the second LPAR,
    wherein the first LPAR uses the information about the second devices to perform the first operation.

2. The method of claim 1, wherein the storage device is a direct-access storage device (DASD) subsystem shared by the first and second LPARs.

3. The method of claim 1, comprising:
    determining that a first device of the first devices is approaching a predetermined threshold capacity,
    wherein the predetermined threshold capacity is based on a number of operations being concurrently performed by the first device;
    outputting a warning which indicates that the first device is approaching the predetermined threshold capacity,
    wherein the warning is output to the storage device for storing therein;
    receiving indication of resources available on another LPAR that is in communication with the storage device; and
    using the resources of the another LPAR to prevent the first device from exceeding the predetermined threshold capacity.

4. The method of claim 3, wherein the another LPAR in communication with the storage device is a third LPAR,
    wherein using the resources of the third LPAR to prevent the first device from exceeding the predetermined threshold capacity includes: outputting a request for a third device physically connected to the computer to perform a second operation for the first device.

5. The method of claim 1, comprising:
    accessing, by the first LPAR, a request on the storage device for the second LPAR to access a specified sub-portion of the information about the first devices, wherein the information about the first devices is restricted device information, wherein the request was previously sent to the storage device by the second LPAR for storage therein; and
    sending, by the first LPAR, a response to the storage device for storage therein, wherein the response indicates whether the second LPAR is granted access to the specified sub-portion of the restricted information about the first devices.

6. The computer implemented method of claim 1, comprising:
    determining, using the information about the second devices, that one of the first device utilizes a different clock sequence than a clock sequence utilized by one of the second devices,
    wherein the determination is based on a comparison of a coordinated universal time (UTC) timestamp of the information about the second devices with a UTC timestamp of the information about the first devices; and
    using the information about the second devices to perform a data mirroring operation, by the one of the first devices that utilizes the different clock sequence for the second LPAR, wherein using the information about the second devices to perform the data mirroring operation includes compensating for the difference in clock sequences.

7. The method of claim 1,
    wherein the first operation is a print operation.

8. The method of claim 1, comprising:
    in response to a determination that less than a predetermined amount of the information about the second devices is stored on the storage device, determining that the second LPAR and/or one of the second devices is no longer in communication with the storage device; and
    deleting the information about the second devices from the storage device.

9. A computer program product for device information sharing between a plurality of logical partitions (LPARs), the computer program product comprising a computer readable storage medium having program instructions embodied therewith, the program instructions readable and/or executable by a first LPAR of a computer to cause the first LPAR to:
- obtain, by the first LPAR, information about first devices physically connected to the computer;
- send, by the first LPAR, the information about the first devices to a storage device for storage therein;
- access, by the first LPAR, information about second devices physically connected to the computer,
- wherein the information about second devices was previously stored on the storage device by a second LPAR of the computer;
- access, by the first LPAR, a first warning stored on the storage device, wherein the first warning indicates that a first of the second devices is approaching a predetermined threshold capacity;
- in response to accessing the first warning on the storage device, determine, by the first LPAR, available resources of the first LPAR for preventing the first of the second devices from exceeding the predetermined threshold capacity;
- send, by the first LPAR, information detailing the determined available resources of the first LPAR to the storage device for storage therein; and
- perform, by the first LPAR, a function using the information about the second devices.

10. The computer program product of claim 9, wherein the storage device is a direct-access storage device (DASD) subsystem shared by the first and second LPARs.

11. The computer program product of claim 9, the program instructions readable and/or executable by the first LPAR to cause the first LPAR to:
- determine that a first device of the first devices is approaching a predetermined threshold capacity, wherein the predetermined threshold capacity is based on a size of a data mirroring operation;
- output a second warning which indicates that the first device is approaching a predetermined threshold capacity;
- receive indication of resources available on another LPAR that is in communication with the storage device; and
- use the resources of the another LPAR to prevent the first device from exceeding the predetermined threshold capacity.

12. The computer program product of claim 11, wherein the another LPAR in communication with the storage device is a third LPAR,
- wherein using the resources of the third LPAR to prevent the first device from exceeding the predetermined threshold capacity includes: outputting a request for a third device physically connected to the computer to perform an operation for the first device.

13. The computer program product of claim 9, the program instructions readable and/or executable by the first LPAR to cause the first LPAR to:
- access, by the first LPAR, a request on the storage device for the second LPAR to access a subset of the information about the first devices, wherein the subset of the information about the first devices corresponds to a random sample of the first devices, wherein the information about the first devices is restricted device information, wherein the request was previously sent to the storage device by the second LPAR for storage therein; and
- send, by the first LPAR, a response to the storage device for storage therein, wherein the response indicates whether the second LPAR is granted access to the subset of the restricted information about the first devices.

14. The computer program product of claim 9, the program instructions readable and/or executable by the first LPAR to cause the first LPAR to:
- determine, using the information about the second devices, that one of the second devices utilizes a different clock sequence than a clock sequence utilized by one of the first devices; and
- use the information about the second devices to perform an operation, by the one of the first devices that utilizes the different clock sequence, for the second LPAR, wherein using the information about the second devices includes compensating for the difference in clock sequences.

15. The computer program product of claim 9, the program instructions readable and/or executable by the first LPAR to cause the first LPAR to:
- access, by the first LPAR, a request on the storage device for using the first LPAR to perform a print operation for the second LPAR, wherein the request was previously sent to the storage device by the second LPAR for storage therein; and
- use, by the first LPAR, the information about the second devices to perform the print operation for the second LPAR.

16. The computer program product of claim 9, the program instructions readable and/or executable by the first LPAR to cause the first LPAR to:
- in response to a determination that the information about the second devices does not include periodic updates, determine that the second LPAR and/or one of the second devices is no longer in communication with the storage device; and
- delete the information about the second devices from the storage device.

17. A system, comprising:
- a processor; and
- logic integrated with the processor, executable by the processor, or integrated with and executable by the processor, the logic being configured to:
- obtain, by a first logical partition (LPAR) of a computer, information about first devices is physically connected to the computer, wherein the information about the first devices includes timestamp information of the first devices;
- send, by the first LPAR, the information about the first devices to a storage device for storage therein;
- access, by the first LPAR, information about second devices physically connected to the computer, wherein the information about second devices was previously stored on the storage device by a second LPAR of the computer,
- wherein the information about the second devices includes timestamp information of the second devices; and
- perform, by the first LPAR, a function using the information about the second devices.

18. The system of claim 17, wherein the storage device is a direct-access storage device (DASD) subsystem shared by the first and second LPARs, wherein the information about the first devices includes configuration settings of the first devices, wherein the information about the second devices includes configuration settings of the second devices.

19. The system of claim 17, the logic being configured to:
determine that a first device of the first devices is approaching a predetermined threshold capacity, wherein the predetermined threshold capacity is based on a temperature of the first device;
output a warning which indicates that the first device is approaching a predetermined threshold capacity;
receive indication of resources available on another LPAR that is in communication with the storage device; and
use the resources of the another LPAR to prevent the first device from exceeding the predetermined threshold capacity.

20. The system of claim 19, wherein the another LPAR in communication with the storage device is a third LPAR, wherein using the resources of the third LPAR to prevent the one of the first devices from exceeding the predetermined threshold capacity includes: outputting a request for a third device physically connected to the computer to perform an operation for the one of the first devices.

* * * * *